United States Patent [19]

Papai

[11] 3,974,910

[45] Aug. 17, 1976

[54] FLUID CYLINDER DECELERATING MEANS

[76] Inventor: Imre F. Papai, 2818 E. 119th St., Cleveland, Ohio 44120

[22] Filed: Feb. 28, 1975

[21] Appl. No.: 554,313

[52] U.S. Cl. .................................. 198/203; 91/394; 91/396

[51] Int. Cl.[2] .................... B65G 23/00; F15B 15/22

[58] Field of Search ................ 198/110, 203; 74/88, 74/112, 125.5, 126, 130; 91/26, 392, 394, 396

[56] References Cited

UNITED STATES PATENTS

| | | | |
|---|---|---|---|
| 2,674,093 | 4/1954 | Slomer | 198/203 |
| 2,911,952 | 11/1959 | Peras | 91/394 |
| 3,122,063 | 2/1964 | Chorkey | 91/26 |
| 3,238,850 | 3/1966 | Desmarchelier | 91/394 |
| 3,476,014 | 11/1969 | Churchill et al. | 91/394 |
| 3,677,141 | 7/1972 | Lagerqvist et al. | 91/394 |
| 3,727,518 | 4/1973 | Gooding | 91/26 |

*Primary Examiner*—Evon C. Blunk
*Assistant Examiner*—Joseph E. Valenza
*Attorney, Agent, or Firm*—McNenny, Pearne, Gordon, Gail, Dickinson & Schiller

[57] ABSTRACT

A piston and cylinder actuator is disclosed embodying means to control the acceleration and deceleration of the piston as it approaches the ends of its stroke. Such actuator is also disclosed as an intermittent drive for a machine system in which at least part of the drive connection is provided by a friction drive. The acceleration and deceleration control is arranged to prevent slippage in the drive. The acceleration and deceleration control includes a land positioned on each side of the piston, each formed with a plurality of axially spaced orifices. As the piston approaches one end of its stroke, one land projects through an associated seal which operates to progressively isolate the orifices from the main chamber to control deceleration. Such orifices are progressively uncovered as the piston moves away from its end position, and in one embodiment provides controlled acceleration. The other land functions in a similar manner to control piston acceleration and deceleration at the other end of the piston stroke. One of the lands is provided by a tubular element positioned around the piston rod and proportioned so that it does not significantly change the effective area of the piston as the land comes into or goes out of operation. The lands are proportioned to provide the same deceleration rates at each end of the piston stroke. In a second embodiment, a separate adjustable flow restriction is provided to control acceleration of the piston without materially affecting its deceleration.

5 Claims, 5 Drawing Figures

FLUID CYLINDER DECELERATING MEANS

BACKGROUND OF THE INVENTION

This invention relates generally to piston and cylinder actuators, and more particularly to such an actuator incorporating novel and improved means to control the acceleration and deceleration of such actuator at the ends of its stroke, and to a system incorporating such an actuator as a power source.

PRIOR ART

Various systems have been used in piston and cylinder actuators to control the rate of acceleration and deceleration of the device. In many instances, such control is provided by utilizing a projection on the piston which telescopes into a mating section in the cylinder head when the piston is close to one or the other ends of its stroke, to modify the flow resistance of the fluid. Usually some form of flow resistance comes into operation at such time to provide a damping action and to control the rate of pistons acceleration or deceleration. Examples of such actuators are described in the U.S. Letters Pat. No. 2,443,312 dated June 15, 1948, U.S. Pat. No. 3,054,384 dated Sept. 18, 1962, U.S. Pat. No. 3,395,725 dated Aug. 6, 1968, U.S. Pat. No. 3,608,437 dated Sept. 28, 1971, U.S. Pat. No. 3,613,503 dated Oct. 19, 1971, U.S. Pat. No. 3,677,141 dated July 18, 1972 and U.S. Pat. No. 3,774,503 dated Nov. 27, 1973.

In the U.S. Pat. No. 2,443,312 and U.S. Pat. No. 3,677,141, a structure is utilized in which a plurality of orifices are progressively closed as the piston approaches its end positions to progressively increase the damping action.

SUMMARY OF THE INVENTION

The present invention has several important aspects. In accordance with one important aspect of this invention, a piston and cylinder actuator is provided with a novel and improved structure for controlling the deceleration of the piston as it approaches its extended end position and for controlling the acceleration of the piston as it commences to retract. The illustrated structure includes a land section provided by a sleeve, positioned around the piston rod and which telescopes into a mating chamber in the rod end cylinder head. The land is provided with a plurality of flow control orifices. These orifices are progressively covered and uncovered as the piston moves toward and away from the extension end of its stroke. In one embodiment the orifices function during deceleration and acceleration and provide a smooth, controlled rate of deceleration as the piston approaches its extension end of the stroke and provide a smooth, controlled acceleration as the piston begins to retract. The structure is arranged so that the acceleration control does not significantly change the effective area of the piston when it comes into or goes out of operation.

In accordance with another aspect of this invention, a novel and improved structure is provided to also control the acceleration of the piston as it commences to extend and to control the deceleration of the piston as it approaches its fully retracted position. In accordance with this aspect of the invention, a similar cushioning control is provided as the piston approaches both ends of its stroke and acceleration control is provided both on retraction and extension of the piston.

In accordance with another aspect of this invention, a system is provided, in a second embodiment, in which an adjustable restriction operates during acceleration of the piston, but does not materially operate during deceleration occurring as the piston approaches its end positions. Such system includes two oppositely acting unidirectional seals which are engaged by the land when the piston is near one end or the other end of its travel. A passage system opens to the zone between the seals and bypasses one seal, an adjustable flow restriction is provided in this passage system. With this embodiment, the adjustment of the restriction does not affect the deceleration of the piston, but does affect its acceleration. This is achieved without the need for moving parts and provides a very reliable control system.

In accordance with still another aspect of this invention, a machine system is provided in which a novel and improved piston and cylinder actuator is connected to intermittently drive the machine in such a way that slippage does not occur even though the machine depends, at least in part, upon friction in the driving operation thereof. In the illustrated embodiment, the machine includes a conveyor, which is intermittently indexed by a piston and cylinder actuator. Such conveyor operates to carry articles progressively along to a plurality of indexed positions. The piston and cylinder actuator is controlled so that it smoothly accelerates and decelerates the conveyor to prevent sliding movement of the articles along the surface of the conveyor belt. Further, the structure is arranged so that the drive for the conveyor belt does not slip, even though a frictional drive is utilized.

These and other aspects of this invention are fully described in the following specification.

DETAILED DESCRIPTION OF THE DRAWINGS

Figure 1:
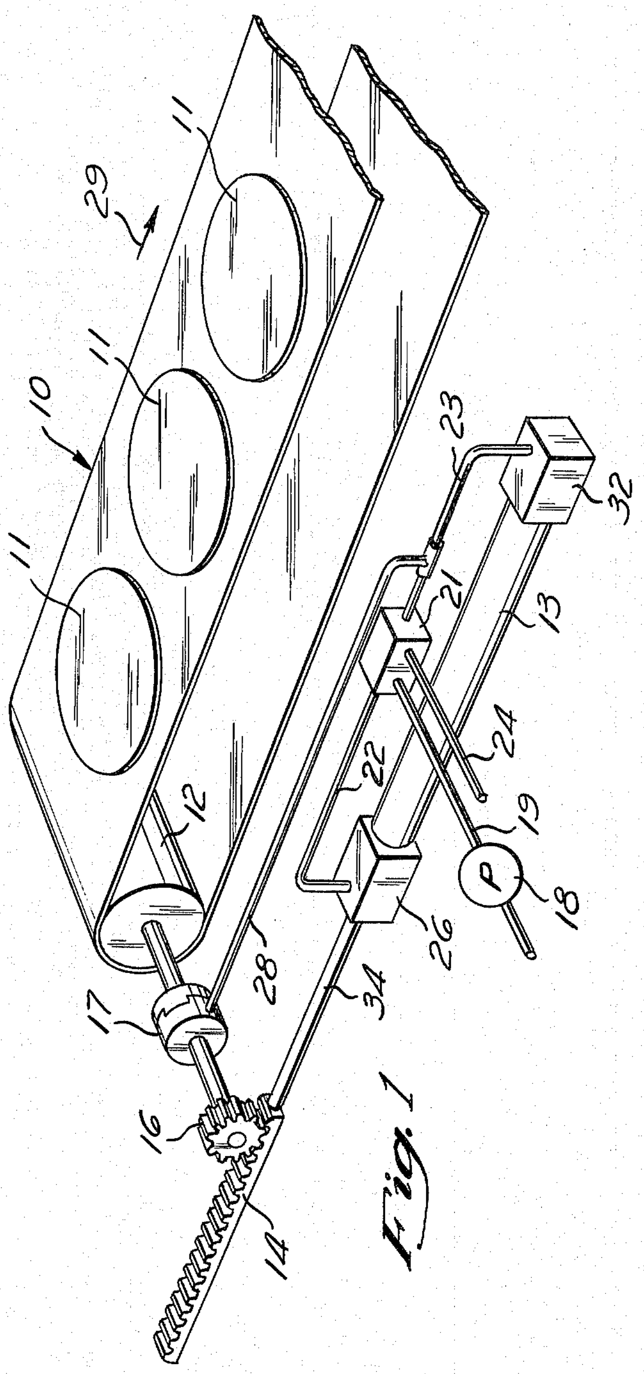
FIG. 1 is a fragmentary schematic illustration of a conveyor for progressively moving articles resting thereon, to predetermined indexed positions wherein the conveyor is intermittently driven through a friction drive by a piston and cylinder actuator incorporating the present invention.

FIG. 1 schematically illustrates an embodiment of this invention in which a conveyor belt 10 is provided with an upper reach adapted to support a plurality of articles 11, and to transport such articles in an intermittent manner between a plurality of indexed positions. The conveyor belt 10 extends around and is powered by a roller 12. A piston and cylinder actuator 13 is connected to drive the roller 12, and in turn the belt 10, through a rack 14, a pinion 16 and an air clutch 17 which is engaged only when pressurized. A pump 18 is connected through a pressure line 19 to a control valve 21. When the valve 21 is in one position, a first pressure line 22 is connected to exhaust 24 and a second pressure line 23 is connected to the line 19 and is pressurized. In such valve position, the retraction end head 32 of the cylinder is pressurized and the piston rod 34 extends causing clockwise rotation of the pinion 16. A pressure line 28 connects the clutch 17 to the line 23 so that the clutch 17 is engaged to drive the roller 12 during the extension of the piston rod 34.

When the valve 21 is shifted to its other position, the pressure line 22 is pressurized while the pressure lines 23 and 28 are connected to the exhaust 24. In this position the piston retracts the rack from the extended position illustrated, while the clutch 17 is disengaged, so that such movement does not produce rotation of the roller or driving of the conveyor belt. The valve 21 is arranged for repeated cycling and the actuator thereby progressively moves the conveyor belt 10 in the direction indicated by the arrow 29, through a predetermined distance during each cycle of operation of the actuator.

The actuator 13 is provided with means to control the rate of acceleration and deceleration at the beginning and end of its stroke so that the roller 12 does not slip with respect to the conveyor belt 10, as the actuator accelerates and decelerates the conveyor. If slippage were encountered, the amount of movement of the conveyor during a given cycle of operation would not be accurately maintained, and proper indexing would not be accomplished.

The damping means for controlling the acceleration and deceleration of the actuator 13 is also selected so that slippage will not occur between the articles 11 and the conveyor. Here again, slippage would result in inaccurate positioning of the articles as they are progressively moved along by the conveyor. In the illustrated embodiment, the articles 11 are progressively carried through a number of indexed positions, at which various operations may be performed on the articles. Those skilled in the art will recognize that if the accurate positioning of each of the articles is not maintained, the operations occurring at each indexed position could not be successfully accomplished.

Figure 2:
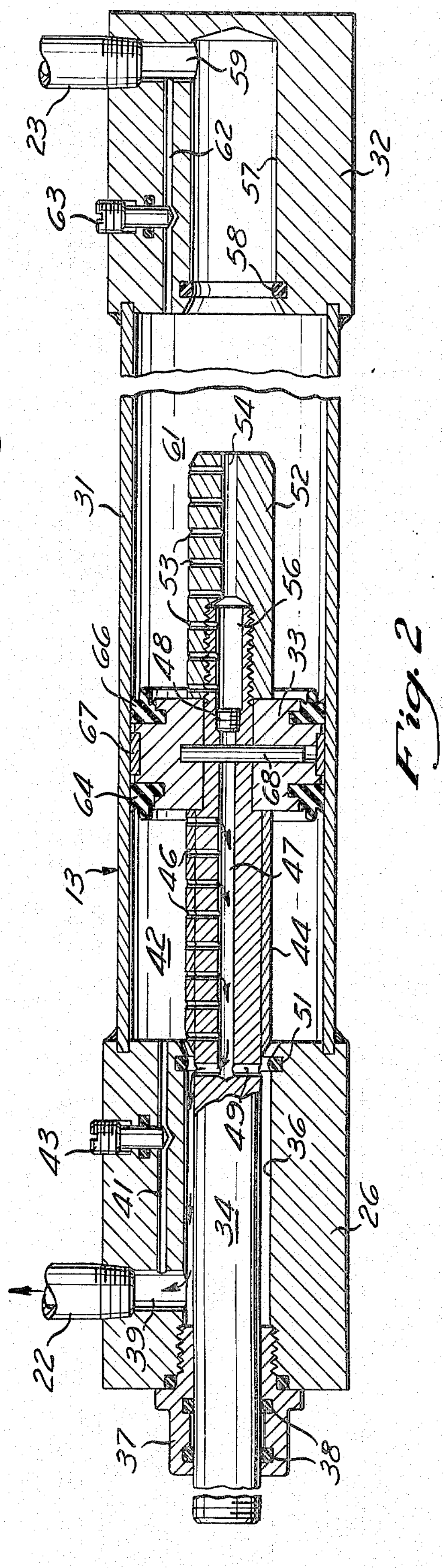
FIG. 2 is a side elevation in longitudinal section illustrating the structural detail of one preferred piston and cylinder actuator incorporated in the present invention.

FIG. 2 illustrates the structural detail of the first illustrated embodiment of the actuator 13. The actuator includes a tubular cylinder member 31, provided with a piston rod end head 26 at one end and a retraction end head 32 at its other end. A piston 33 is reciprocable in the cylinder 31 between the two heads 26 and 32. The piston 33 is mounted on a piston rod 34, which extends out along a passage 36, formed in the head 26 and through a gland nut 37 providing elastomeric seals 38 which seal with the surface of the rod 34, while allowing reciprocation of the rod. The bore 36 is sized to receive the rod 34 with substantial clearance.

The pressure line 22 is threaded into a port 39, which is open at its inner end to the bore 36. A passage 41 extends along the head 26 from the port 39 to the first variable volume chamber 42, defined by the cylinder member 31, the head 26 and the piston 33. The resistance to flow along the passage 41 is manually adjustable by a flow restriction member 43 which is threaded into the head 26, and which is provided at its inner end with a conical surface which extends into the passage 43, an amount determined by the adjustment of the member 43.

An annular land or tube 44 is positioned around the piston rod 34, adjacent to the piston 33 and is proportioned to fit into the bore 36 as the piston approaches its extended position. A plurality of small orifices 46 are formed in the land 44 and piston rod 34, extending from the outer surface of the land to a central passage 47, formed in the piston rod. The passage 47 is plugged at 48 and extends along the piston rod within the land 44 to a cross passage 49. A bidirectional seal 51, mounted in the head 26, engages the other surface of the land 44 as it enters the bore 36, so that direct communication between the first chamber 42 and the bore 36 is provided through the orifices 46 when the land extends through the seal 51. The orifices 46 are spaced along the length of the land 44 so that the orifices 46 are progressively closed off or isolated from the chamber 42, as the land enters and moves along the seal toward the fully extended position of the actuator. In the drawing, the orifices 46 are illustrated in a single plane for purposes of illustration. In practice, it is preferably to arrange them in a spiral to reduce seal wear. As the piston 33 begins to retract, the orifices 46 are progressively opened to provide increased communication between the port 39 and the chamber 42, until the land 44 moves out of the seal 51. After this occurs, full communication is provided between the port 39 and the chamber 42, along the annular space between the bore 36 and the piston rod 34.

A second land 52 is threaded onto the end of the piston rod 34, on the side of the piston 33, remote from the land 44. Here again, the land 52 is formed with a plurality of axially spaced orifices 53, which extend from the surface of the land inwardly to a central passage 54 in the land 52, or a passage 56 in the end of the piston rod which communicates with the passage 54. The land 52 is proportioned to telescope into a bore 57, formed in the head 32. A bidirectional seal 58, mounted in the head 32, is proportioned to engage and seal with the surface of the land 52. The head 32 is formed with a port 59, which receives the end of the pressure line 23 and communicates with the bore 57.

When the land 52 is spaced from the seal 58, as illustrated in FIG. 2, full and unrestrictive communication is provided between the pressure line 23 and the second expansible chamber 61 of the actuator. However, when the land 52 projects through the seal 58, the direct communication between the bore 57 and the chamber 61 is restricted to the orifices, which are progressively closed as the land moves into the bore. Here again, an auxillary passage 62, connects the port 59 and the chamber 61, to bypass the main flow path during the damping operation. Also, an adjustable flow restricting member 63 is threaded into the head 32, and projects into the passage 62 to permit manual adjustment of the resistance to flow through the passage 62.

Mounted on the piston head 33 are a pair of opposed lip seal rings 64 and 66. A bearing ring 67, carried by the piston 33 guides the piston in its reciprocation along the cylinder member 31. A cross pin 68 securely connects the piston 33 to the piston rod 34, and cooperates with the land 52 to maintain the various elements of the piston assembly in their assembled condition. Preferably, the land 44 is press-fitted onto the piston rod. However, other suitable means may be provided to secure the land against movement with respect to the rod.

Figure 3:
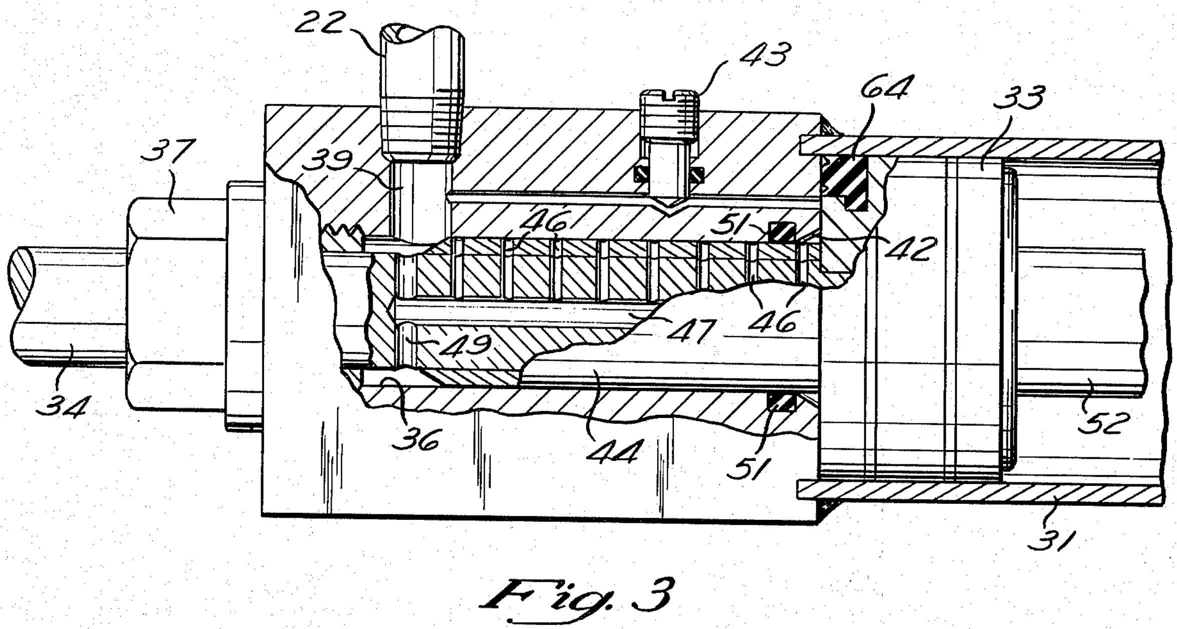
FIG. 3 is a fragmentary longitudinal section illustrating the actuator of FIG. 2 with the piston in the extended end of its travel.

In operation, each of the lands functions to control the deceleration of the piston 33, as it approaches one end of its travel, and also, the acceleration as it commences to move from such end position. Referring to FIG. 3, when the piston 33 is in its end position of extension, the seal 51 isolates all of the orifices 46 from the chamber 42, excepting the last orifice adjacent to the piston 33. It is recognized that a restricted flow connection is also provided through the passage 41, past the adjustable restriction 43. However, for purposes of the discussion of the operation of the lands and their damping functions, such connection along the passage 41 will be neglected at this time.

Assuming the elements are in the extended end position of FIG. 3, when fluid under pressure is supplied to the port 39 through the pressure line 22, a very restricted flow connection is provided through a single orifice 46 between the chamber 42 and the port 39. Such connection includes the passages 47 and 49. Because of the restricted connection provided by the single orifice, the rate of flow to the chamber 42 is relatively small. Consequently, the rate of retraction of the piston is initially relatively slow and does not involve a high acceleration. As the piston 33 moves to the right, as viewed in FIG. 3, additional orifices 46 move past the seal 51 to increase the rate of flow and to decrease the net resistance to flow. Therefore, the piston 33 continues to accelerate at a rate which is controlled by the orifices 46 until the land 44 moves clear of the seal 51 to provide a substantially unrestricted flow connection between the chamber 42 and the port 39.

During the initial movement of the piston, the effective area of the piston 33, within the chamber 42, is equal to the area within the seal 64, minus the area within the seal 51. It is over such area that the fluid under pressure within the chamber 42 acts to produce a retracting force on the piston 33. An additional area is acted upon by the supply pressure from the port 39 and this is the cross-sectional area of the land 44, which is equal to the area within the seal 51, minus the area within the seals 38. However, since the area of the land 44 is small compared to the effective area of the piston 33, the force produced by the action of the fluid under pressure on the cross-sectional area of the land, is relatively minimal. In the illustrated embodiment, the cross-sectional area of the land tube 44 is less than 20% of the retraction effective area of the piston. Once the land 44 leaves the seal 51, the effective area of the piston 33 is equal to the area within the seal 64 minus the area of the piston rod 34 within the seals 38.

When the piston 33 moves from the retracted position toward the extended position of FIG. 3, the land 44 also functions to control the deceleration of the piston. Prior to movement of the land 44 into the seal 51, substantially unrestricted communication is provided between the chamber 42 and the port 39, along the bore 36 around the piston rod 34. At such time the port 39 is connected to the exhaust through the pressure line 22 and the pressure in the chamber 42 approaches exhaust pressure.

When the land 44 first enters the seal 51, all of the orifices 46 are available for exhaust of the fluid from the chamber 42. However, even when such connection is provided, a flow restriction results which causes a build up of back pressure in the chamber 42. This commences to decelerate the piston. As the piston continues to move toward the extended position, the orifices are progressively covered until the condition of FIG. 3 is reached. Because the resistance to exhaust flow increases as the orifices are progressively isolated from the chamber 42, the build up of back pressure within the chamber 42 continues, even though the piston is slowing down. Here again, because the cross-sectional area of the land 44 is relatively small, the effective area of the piston within the chamber 42, is not significantly reduced when the land comes into action.

Figure 4:
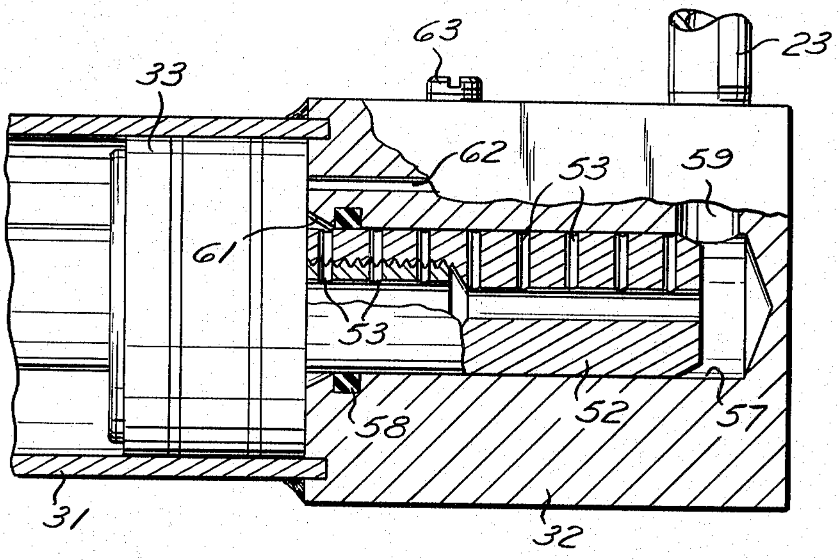
FIG. 4 is a fragmentary longitudinal section illustrating the actuator with the piston in the retracted end of its travel.

Referring now to FIG. 4, the land 52 functions in a similar manner to control the acceleration and deceleration of the piston 33, at the retracted end of the stroke. When the port 59 is pressurized to commence extension of the piston, a single orifice 53 provides the communication between the chamber 61 and the port 59. Here again, the connection provided by the passage 62 is neglected for purposes of discussion. Because of the high resistance to flow through the single orifice, the acceleration of the piston is relatively slow initially. As the piston extends, additional orifices are brought into communication with the chamber 61 to reduce the resistance to flow, allowing the acceleration to continue until the land 52 leaves the seal 58. When this occurs, unrestricted communication is provided between the chamber 61 and the port 59, through the bore 57.

During the initial extension of the piston, of course, the full pressure acts on the effective area of the land to produce an extending force. However, the area of the land 52 is small compared to the effective area of the piston within the chamber 61, so the principle control is provided by the orifices.

During retraction of the piston 33, the opposite action occurs. When the land 52 initially enters the seal 58, all of the orifices 53 provide communication between the chamber 61 and the port 59, which is, of course, connected to exhaust during such movement. The restriction to flow causes a build up of back pressure which commences the deceleration of the piston. As the piston continues to move toward the retracted position of FIG. 4, the restriction to flow from the chamber 61 is increased by progressively isolating the various orifices 53 from the chamber 61. In the preferred embodiment illustrated, the outside diameter of the land 52 is equal to the outside diameter of the land 44 so that the damping obtained to decelerate the piston as it approaches both end positions is equal. This is because the effective area of the piston within the chamber 42 and within the chamber 61 is equal, when the respective lands are in engagement with their respective seals and because equal orifice sizes and numbers are provided on both lands. With such a system, symmetrical deceleration damping is obtained.

In the above discussion, the damping provided by the flow along the passages 41 and 62 has been disregarded. In practice, the two lands are preferably provided with a number of orifices of a size, selected to produce a degree of damping or acceleration and deceleration control, which is at least equal to the maximum damping desired in a given installation. With such an arrangement, adjustment of the two members 43 and 63 to allow restricted flow along the two passages 41 and 62, reduces the effective dampening and enables the user to adjust the actuator to produce the exact damping rate which is desired.

It should be recognized that during the deceleration damping caused by the build up of back pressure on the exhaust side of the piston, the full supply pressure remains on the opposite or supply side of the piston. Therefore, the back pressure must usually exceed the supply pressure in order to provide substantial deceleration. Because of this, the resistance to flow must often be quite high. Consequently, the rate of acceleration may be low if the same resistance to flow, which provides the desired deceleration is present when a piston accelerates away from its end positions.

Figure 5:
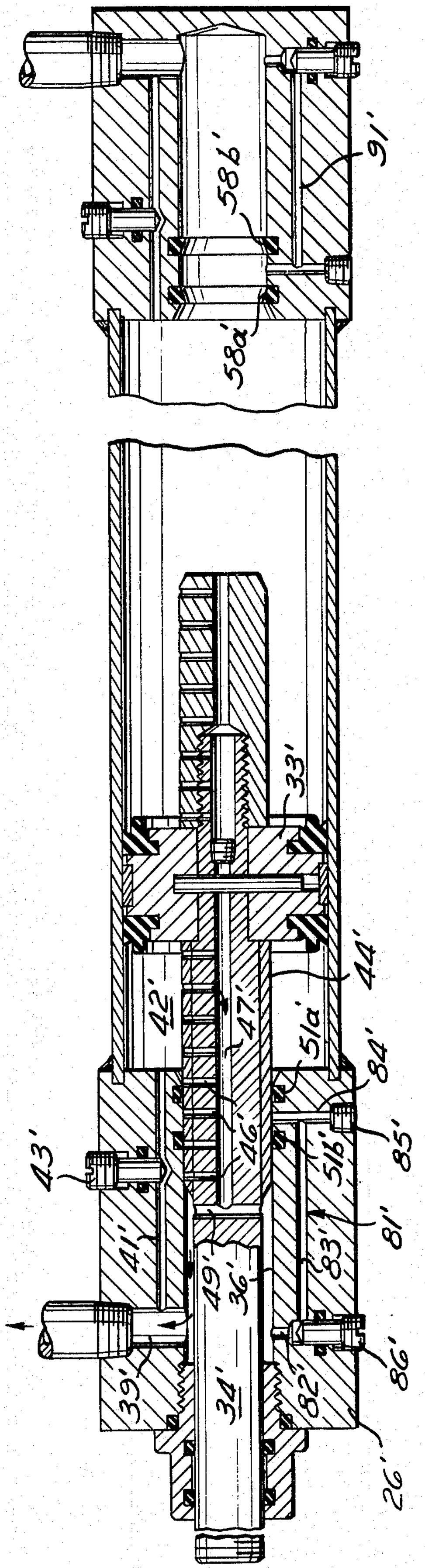
FIG. 5 is a side elevation in longitudinal section of a second embodiment of a piston and cylinder actuator incorporating this invention.

In the second embodiment of FIG. 5, a modified damping system is illustrated, in which the resistance to flow during deceleration differs from the resistance to flow during acceleration. In this embodiment referenced numerals are used which correspond to similar elements in the first embodiment, but a prime (′) is added to indicate the reference is made to the second embodiment of FIG. 5.

The piston 33′, piston rod 34′ and tubular land 44′ in this embodiment, are the same as in the first embodiment. However, in this embodiment a pair of oppositely acting unidirectional seals 51*a*′ and 51*b*′ are mounted in the head 26′ for sealing engagement with the land 44′. The seal 51*a*′ is arranged to seal against flow from the chamber 42′ while allowing substantially unrestricted flow toward the chamber 42′. The seal 51*b*′ is oppositely acting in that it functions, when in engagement with the land 44′, to prevent flow in the direction toward the chamber 42′, while allowing substantially unrestricted flow in the opposite direction. The two seals 51*a*′ and 51*b*′ are spaced axially along the passage 36′.

A passage system 81′ is provided in the head 26′ and includes a radial passage 82′, an axial passage 83′ and a second radial passage 84′, open to the passage 36′ between the two seals 51*a*′ and 51*b*′. A plug 85′ closes the outer end of the passage 84′ and a similar arrangement (not illustrated) is usually provided in the passage 83′. An adjustable flow restriction member 86′ is located at the intersection between the two passages 82′ and 83′ and is adjustable to adjust the resistance to flow along the passage system 81′.

During the end portion of the movement of the piston rod toward its extended position, the seal 51*a*′ functions to prevent flow past the seal from the chamber 42′. Therefore, as soon as the land 44′ engages the seal 51*a*′, the exhaust flow of the fluid within the chamber 42′ must pass through the orifice system provided by the orifices 46′, the passage 47′ and the passage 49′. Here again, the flow through the passage system including the passage 41′ and the member 43′ is neglected for purposes of explanation, while recognizing that parallel flow does exist through this passage system. The flow from the chamber 42′ is not affected by the existence of the passage system 81′ because the seal 51*b*′ is unidirectional and does not significantly restrict flow toward the exhaust. Consequently, the passage system 81′ does not materially affect the amount of damping which occurs during deceleration and the rate of deceleration is determined by the resistance to flow produced by the orifices 46′ and the resistance to flow through the passage 41′.

However, acceleration of the piston from its fully extended position is affected principally by the resistance to flow through the passage system 81′. During the initial retraction, the port 39′ is supplied with fluid under pressure which extends to the seal 51*b*′. However, such seal 51*b*′ prevents flow along the outside of the land 44′ toward the chamber 42′, so long as the land 44′ remains in engagement with the seal 51*b*′. As long as the cross passage 49′ is to the left of the seal 51*b*′, as viewed in FIG. 5, flow can occur through the orifice system to the chamber 42′. However, a flow path is also provided through the passage system 81′, which bypasses the seal 51*b*′, since the seal 51*a*′ does not prevent flow toward the chamber 42′. Therefore, during acceleration the passage system 81′ connects the supply to the chamber 42′ and functions in parallel with the orifice system to permit greater flow and to permit increased acceleration rates of the piston.

In practice, the restriction member 43′ is adjusted to cooperate with the orifice system and produce the desired rate of deceleration. The members 86′ is then adjusted to provide the desired rate of acceleration of the piston. Since the flow restriction required for deceleration is usually greater than the flow restriction required for a desired rate of acceleration, the adjustment of the member 86′ permits the user to obtain the exact desired acceleration rate. With this system, it is possible to accurately adjust the operation of the actuator so that the desired deceleration rate is obtained, as well as a specific desired acceleration rate.

Here again, a similar structure is provided at the retraction end cylinder head, wherein a pair of opposed unidirectional seals 58*a*′ and 58*b*′ are combined with an adjustable resistance passage system 91′ which, like the passage 81′, bypasses one seal to allow independent adjustment of the deceleration rate and the acceleration rate obtained at the retracted end of the piston stroke.

Although preferred embodiments of this invention are illustrated, it should be understood that various modifications and rearrangements of parts may be resorted to without departing from the scope of the invention disclosed and claimed herein.

What is claimed is:

1. A fluid actuator comprising a cylinder having first and second cylinder heads, a piston reciprocable in said cylinder between said heads, a piston rod connected to said piston and extending through said first head, a piston rod seal on said first head sealing with said piston rod, said cylinder and piston cooperating to define first and second chambers the volume of which is changed by reciprocation of said piston, first and second lands projecting from opposite sides of said piston, said first head providing a first bore proportioned to receive said first land as said piston approaches said first head, said second head providing a second bore proportioned to receive said second land as said piston approaches said second head, a port in each head connected to the associated bore, land seal means in said heads sealing with each associated land when it projects into its associated bore, each land providing a plurality of orifices which bypass the associated land seal means as said land moves into its associated land seal providing a restricted connection for flow of fluid from the associated chamber, movement of each land into its associated bore causing the associating land seal to progressively change the number of orifices in communication with the associated chamber to progressively change the flow restriction from such associated chamber, said piston rod including axial passages open to each orifice within the associated land and bypassing the associated land seal when each land seal engages its associated land, said first land being a tubular member mounted on said piston rod adjacent to said piston, said tubular member having a cross-sectional area proportioned so that the effective area of the adjacent side of said piston is changed by no more than about twenty percent when said first land enters and leaves the associated land seal, a separate flow path being provided between each chamber and its associated port, and at least one of said separate flow paths is provided with a restriction which affects acceleration of said piston without materially affecting deceleration thereof, said land seal means associating with said one separate flow path including a pair of spaced oppositely acting unidirectional seals and said one separate flow path bypassing one of said unidirectional seals.

2. A fluid actuator as set forth in claim 1 wherein said restriction of said one separate flow path is adjustable to permit adjustment of the rate of acceleration of said piston without materially affecting its corresponding deceleration.

3. A fluid actuator as set forth in claim 2 wherein a second separate flow path is provided between each chamber and its associated port which is provided with an adjustable restriction which is affective in adjusting both acceleration and deceleration of said piston.

4. A fluid actuator comprising a cylinder having first and second cylinder heads, a piston reciprocable in said cylinder between said heads, a piston rod connected to said piston and extending through said first head, a piston rod seal on said first head sealing with said piston rod, said cylinder and piston cooperating to define a chamber the volume of which is changed by reciprocation of said piston, a tubular land on said piston rod adjacent to one side of said piston, a passage in said rod radially within said land and open to the surface of said rod on the side of said land remote from said piston, a plurality of axially spaced orifices through said land and open to said passage, said first head providing a bore proportioned to receive said land as said piston approaches said first head, a port in said first head connected to said bore, land seal means in said first head sealing with said land when it projects into said bore, movement of said land into said bore causing said land seal to progressively change the number of orifices in communication with said chamber to progressively change the flow restriction from said chamber, said land seal means including a unidirectional seal which prevents flow along the surface of said land from said chamber and allows substantially unrestrictive flow in the opposite direction, said land seal means including a second oppositely acting unidirectional seal spaced from said first mentioned unidirectional seal which is engageable with said land to prevent flow past said second seal along the surface of said land toward said chamber, and separate passage means providing an adjustable flow restriction connecting said port and said bore between said unidirectional seals to bypass said second unidirectional seal as said piston moves from its extended position.

5. A fluid actuator comprising a cylinder having first and second cylinder heads, a piston reciprocable between said heads, a piston rod connected to said piston extending through said first head, a piston rod seal on said head sealing with said piston rod, said cylinder and piston cooperating to define a first chamber the volume of which is changed by reciprocation of said piston, a land projecting from said piston along said piston rod, said first head providing a first bore proportioned to receive said land as said piston approaches said first head, a port in said first head connected to said bore, land seal means in said head sealing with said land when it projects into said bore, said land seal means including a pair of spaced oppositely acting unidirectional seals, passage means connecting said port and said bore between said unidirectional seals and including an adjustable flow restriction, and orifice means associated with said land providing a flow restriction as said piston approaches said first head to decelerate said piston, adjustment of said flow restriction adjusting the acceleration of said piston as it moves away from said first head without materially affecting the deceleration of said piston as said piston approaches said head.

* * * * *